United States Patent [19]

Tanigawa et al.

[11] 4,088,980
[45] May 9, 1978

[54] WARNING DISPLAY SYSTEM FOR VEHICLES

[75] Inventors: Kou Tanigawa, Kobe; Takeshi Ochiai, Toyota, both of Japan

[73] Assignees: Fujitsu Ten Limited, Kobe; Toyota Jidosha Kogyo Kabushiki Kaisha, both of Japan

[21] Appl. No.: 755,864

[22] Filed: Dec. 30, 1976

[30] Foreign Application Priority Data

Dec. 30, 1975 Japan .............................. 51-158910

[51] Int. Cl.$^2$ .............................................. G08B 19/00
[52] U.S. Cl. ................................. 340/52 F; 340/379; 340/412
[58] Field of Search ............... 340/52 F, 213 R, 412, 340/413, 414, 415, 373, 378 R, 379

[56] References Cited
U.S. PATENT DOCUMENTS

| | | | |
|---|---|---|---|
| 3,835,450 | 9/1974 | Reck | 340/52 F |
| 3,987,439 | 10/1976 | Spaniola | 340/413 |
| 4,001,776 | 1/1977 | Carol, Jr. et al. | 340/52 F |

Primary Examiner—Alvin H. Waring

Attorney, Agent, or Firm—Daniel Jay Tick

[57] ABSTRACT

A warning display system provides a warning when it detects an abnormal condition in an operating element closely related to the safe operation of a vehicle. An abnormal condition of an operating element is detected by one of a plurality of sensors each provided at a corresponding operating element. Detected signals of the sensors are fed as input to the fixed contacts of a rotary switch. The sliding arm of the rotary switch and a rotary drum are connected to a rotary driving device. The rotary driving device is driven step by step by the output of an energization circuit which generates a pulse signal. The drum has a plurality of display items indicated on its circumference, which display items respectively correspond to each fixed contact of the rotary switch. A display window is provided adjacent the drum for visual observation of one of the display items at a time. A control circuit discontinues the operation of the energization circuit when the sliding arm of the rotary switch reaches the position of the fixed contact corresponding to the sensor which detects an abnormal condition.

2 Claims, 6 Drawing Figures

WARNING DISPLAY SYSTEM FOR VEHICLES

BACKGROUND OF THE INVENTION

The present invention relates to a warning display system for vehicles. More particularly, the invention relates to a warning display system for motor vehicles, which system detects an abnormal condition of an operating element such as, for example, headlights, engine oil, brake linings, related to safe driving of a vehicle and provides a warning signal for the operator of the vehicle.

U.S. Pat. No. 3,852,712 discloses a warning display system which includes a rotating drum having a plurality of display items indicated on the circumference thereof adjacent a display window. When one of a plurality of sensors positioned at different parts of the vehicle detects an abnormal condition, the drum is rotated up to a determined angle by a drive motor whereby the display item corresponding to the sensor detecting the abnormal condition is visually observable through the display window. In the system of the aforedescribed patent, however, since a plurality of coded conductive logic strips are added to the circumference of the drum and the positions of the sensors and the display items are carried out via such logic strips and the stop command of the drive motor is simultaneously executed, said system is complicated and has the disadvantage of high cost. Furthermore, since the system of the aforedescribed patent includes a ratchet mechanism utilizing a solenoid for the drive motor, said system has the disadvantages of unpleasant noise during operation and high power consumption due to the requirement for a large solenoid.

The principal object of the invention is to provide a warning display system for vehicles which positions the sensor display items on a drum and controls the rotary driving device of the drum with a simple structure which is inexpensive in manufacture.

An object of the invention is to provide a warning display system for vehicles which overcomes the disadvantages of the known system.

Another object of the invention is to provide a warning display system for vehicles which accurately positions a rotating drum and operates without unpleasant noise.

Still another object of the invention is to provide a warning display system for vehicles which includes a test device for checking the integrity of the display and of the driving device, when necessary.

Yet another object of the invention is to provide a warning display system which is installable with facility and convenience in new and existing motor vehicles, such as, for example, automotive vehicles, aircraft, marine craft, and the like.

Another object of the invention is to provide a warning display system which functions efficiently, effectively and reliably to warn the operator of a vehicle of an abnormal condition in an operating element related to the safe operation of the vehicle.

BRIEF SUMMARY OF THE INVENTION

The warning display system for vehicles provides a warning via a rotating display device in accordance with an abnormal condition detected by one or more of a plurality of sensors positioned to monitor the operating elements of a vehicle. The warning display system has the following characteristics. First, a rotary switch is utilized, and the positioning of the sensor display item of the rotating display device thereby and the scanning of the sensors thereby are carried out simultaneously. Second, a step motor is utilized as the rotary driving device and its operation is related to the rotary switch. Furthermore, a starting circuit automatically starts the rotary display device when a sensor detects an abnormal condition to operate up to desired angular position determined by the sensor and to stop the rotary display device at such position for only a determined period of time. Third, the rotary switch is provided with a particular fixed contact and a circuit is provided to position the rotary display device to said fixed contact when no abnormal condition is detected. Fourth, a test device is utilized to artificially provide the rotary display device with the same condition as that of a sensor which detects an abnormal condition.

In accordance with the invention, a warning display system for vehicles for warning of an abnormal condition occurring at operating elements of a vehicle having a plurality of operating elements, comprises a plurality of sensors each provided in operative proximity with a corresponding one of the operating elements. Each of the sensors detects an abnormal condition of the corresponding operating element. A rotary switch has a plurality of fixed contacts each electrically connected to a corresponding one of the sensors and a sliding arm slidably mounted for selectively electrically contacting each of the fixed contacts. A warning display device has a rotatably mounted drum with a plurality of display items indicated on its circumference. Each of the operating elements of the vehicle is represented by a corresponding one of the display items. A display window adjacent the drum permits visual observation of one of the display items at a time. A rotary driving device mechanically coupled to the sliding arm of the rotary switch and to the drum drives the sliding arm and the drum is synchronism. An energization circuit electrically connected to the rotary driving means drives the rotary driving device step by step. A control circuit electrically connected to the energization circuit discontinues the operation of the rotary driving device when the sliding arm of the rotary switch reaches the position of the fixed contact of the rotary switch connected to a sensor which detects an abnormal condition. The control circuit warns of the abnormal condition by visually displaying the corresponding display item of the drum at the display window when the rotary driving means is stopped.

The rotary switch has an additional fixed contact. The control circuit comprises a position control circuit electrically connected to the fixed contacts of the rotary switch and to the rotary driving device for responding to an output of each of the sensors and for controlling the rotary driving device to position the sliding arm of the rotary switch in electrical contact with the additional fixed contact when none of the sensors detects an abnormal condition.

The rotary driving device comprises a step motor. The energization circuit comprises an oscillator for generating a pulse and a motor driving circuit electrically connected between the oscillator and the step motor for converting the pulse generated by the oscillator to a driving voltage for energizing the step motor.

The control circuit further comprises a starting circuit electrically connected to the sliding arm of the rotary switch for receiving output signals from each of the sensors and starting operation of the energization circuit when an abnormal condition is detected by any of the sensors.

A test device has a manually operable switch for starting the rotary driving device.

The control circuit further comprises a delay circuit electrically connected between the starting circuit and the energization circuit for delaying output signals from the starting circuit to the energization circuit during a period of time that the sliding arm of the rotary switch is positioned in electrical contact with a fixed contact of the rotary switch connected to a sensor which detects an abnormal condition.

BRIEF DESCRIPTION OF THE DRAWINGS

In order that the invention may be readily carried into effect, the invention will now be described with reference to the accompanying drawings, wherein.

In the FIGS., the same components are identified by the same reference numerals.

DETAILED DESCRIPTION OF THE INVENTION

Figure 1:
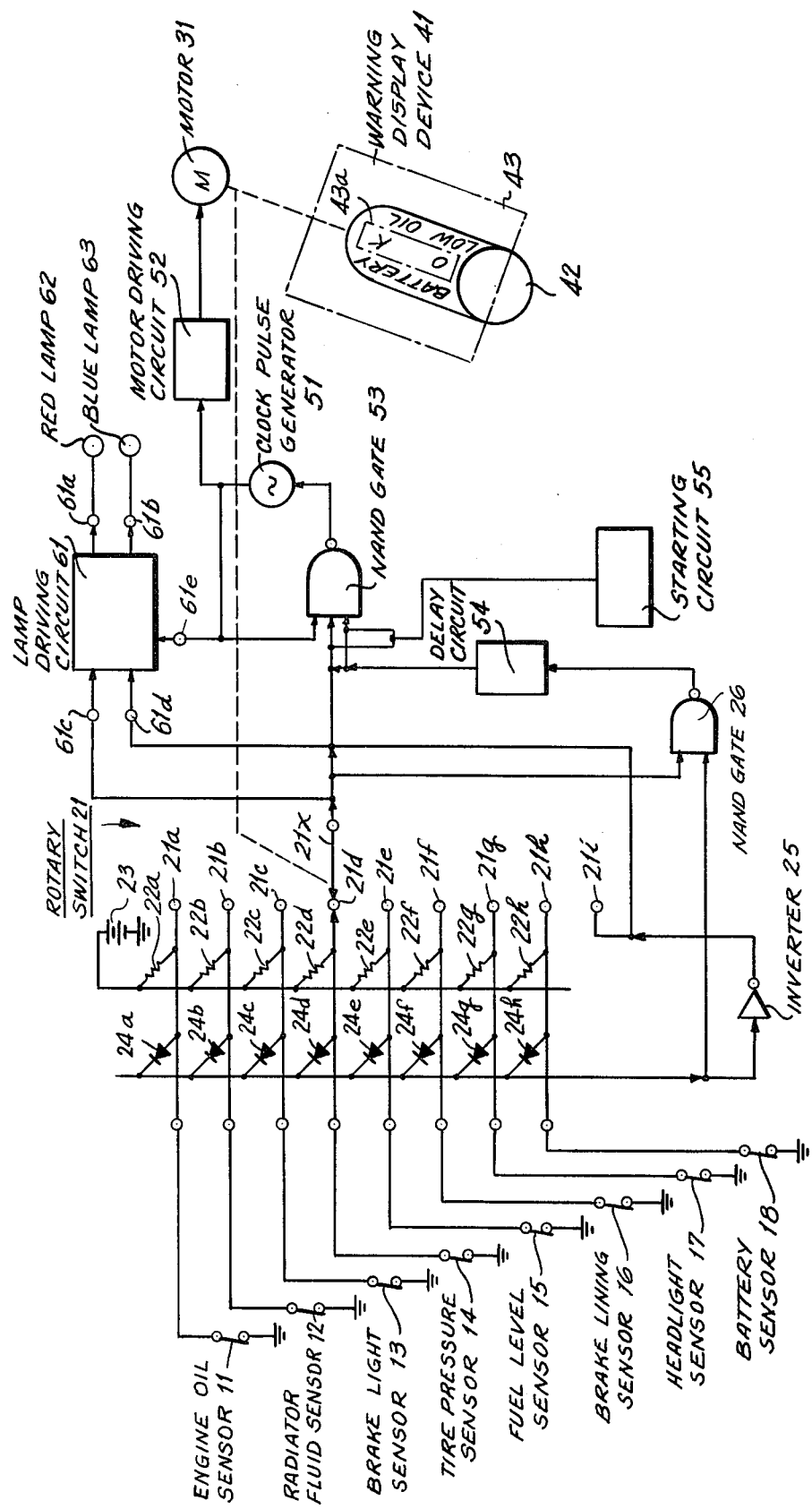
FIG. 1 is a block diagram of an embodiment of the warning display system for vehicles of the invention.

In the warning display system of the invention, sensors 11 to 18 are positioned at the operating elements of a motor vehicle. The sensor 11 is an engine oil sensor and detects an abnormal or low level of engine oil. The sensor 12 is a radiator fluid sensor and detects an abnormal or low level of radiator fluid. The sensor 13 is a brake light sensor and detects a failure or abnormal condition of the brake lights. The sensor 14 is a tire pressure sensor and detects an abnormal or low or high level of tire pressure. The sensor 15 is a fuel level sensor and detects an abnormal or low level of fuel. The sensor 16 is a brake lining sensor and detects an abnormal condition or worn brake lining. The sensor 17 is a headlight sensor and detects a failure or abnormal condition of the headlights. The sensor 18 is a battery sensor and detects an abnormal condition of the battery.

Each of the sensors 11 to 18 has a switch structure which opens mechanically when an abnormal condition is detected. The switch structure of each of the sensors 11 to 18 has a fixed contact connected to a point at ground potential and a movable switch arm. The switch arms of the sensors 11 to 18 are connected to the fixed contacts 21a to 21h, respectively, of a rotary switch 21. The fixed contacts 21a to 21h are connected to a regulated power supply 23 via resistors 22a to 22h, respectively, and are connected to the input terminals of an inverter 25 and to an input of a NAND gate 26 via diodes 24a to 24h, respectively.

The rotary switch 21 also has a fixed contact 21i connected to the output terminal of the inverter 25 and a sliding arm 21x mechanically coupled to the rotary shaft of an electric motor 31.

A NAND gate is an AND gate followed by an inverter, so that it provides a zero output voltage when all input signals are negative, corresponding to one.

A warning display device 41 comprises a rotatably mounted drum 42 and a display disc 43. The rotary drum 42 is mechanically coupled to the rotary shaft of the motor 31. Display items corresponding to the operating element monitored by each sensor are printed in the form of characters or figures on the circumference of the drum 42. The display disc 43 has a small window 43a formed therein and one of the display items of the drum 42 is visually observable through such window at any time. The display items positioned at the window 43a correspond to the fixed contacts 21a to 21i of the rotary switch 21 which sequentially are scanned. The motor 31 is a step motor, and rotates the drum 42 step by step, so that each display item indicted on said drum appears in the window 43a in sequence.

A clock pulse generator or oscillator 51 generates a clock pulse for driving the step motor 31 step by step. A motor driving circuit 52 produces a driving voltage of one cycle consisting of a positive half wave and a negative half wave from the clock pulse. The driving excites the windowing or coil of the motor 31.

A NAND gate 53 controls the oscillating operation of the clock pulse generator or oscillator 51 and has three input terminals. The output of the oscillator 51 is connected to the first input terminal of the NAND gate 53. The sliding arm 21x of the rotary switch 21 is connected to the second input terminal of the NAND gate 53. The output of a delay circuit 54 is connected to the second and third input terminals of the NAND gate 53. The delay circuit 54 delays the output of the NAND gate 26 about 10 seconds, for example. A starting circuit 55 is also connected to the second and third input terminals of the NAND gate 53. The starting circuit 55 has a manually operable switch. When the manual switch of the starting circuit 55 is closed, the starting circuit produces an output voltage at ground potential, of "L" level. The outputs of the delay circuit 54 and the sliding arm 21x are thereby converted to an "L" level signal.

A lamp driving circuit 61 has two output terminals 61a and 61b and three input terminals 61c, 61d and 61e. A red lamp 62 is connected to the output terminal 61a. A blue lamp 63 is connected to the output terminal 61b. The input terminal 61c is connected to the sliding arm 21x of the rotary switch 21. The input terminal 61d is connected to the fixed contact 21i of the rotary switch 21. The input terminal 61e is connected to the output of the oscillator 51.

The lamps 62 and 63 are positioned inside the rotary drum 42. The blue lamp 63 lights under normal conditions and the red lamp 62 lights when an abnormal condition is detected. The ON/OFF operation of the lamps 62 and 63 corresponds to the clock pulse of the oscillator 51.

The system of FIG. 1 operates as follows. When each operating element of the vehicle is operating normally, the sliding arm 21x or rotary switch 21 remains at the fixed contact 21i. Since the sensors 11 to 18 are usually closed, the fixed contacts 21a to 21h are connected to ground and are held at the "L" or low level potential. For this reason, the potenial of the fixed contact 21i appearing at said fixed contact via the inverter 25 is "H" or high level. The NAND gate 26 and the delay circuit 54 thus produce an output signal of "H" level. The output of the NAND gate 53 therefore becomes an "L" level signal and as a result, the oscillator 51 does not operate. In this case, the characters "OK" or a similar indication, indicating that the various display items printed on the circumference of the drum 42 are in normal condition, are visually observable through the display window 43a.

When the starting circuit 55 is operated, the output of the sliding arm 21x and the output of the NAND gate 26 become an "L" level signal. The output of the NAND gate 53 thereby becomes an "H" level signal, and the oscillator 51 thus commences oscillation. As a result, the step motor 31 is provided with the pulse voltage from the motor driving circuit 52 and operates step by step. The drum 42 and sliding arm 21x then rotate step by step, and if an abnormal condition is not detected during the period of rotation, the arm makes one revolution and then returns to the fixed contact 21i. At such time, the oscillator 51 terminates oscillation through the aforedescribed operation step. While the sliding arm 21x of the rotary switch 21 steps the fixed contacts 21a to 21h, the blue lamp 63 flashes in synchronization with its steps. The aforedescribed operation also periodically tests the system.

If, for example, the brake light then develops a broken filament, so that it is in an abnormal condition, the brake light sensor 13 detects such abnormal condition and opens its contact. The potential of the fixed contact 21c thus becomes an "H" level and a voltage of "L" level inverted at the inverter 25 is applied to the fixed contact 21i. These signals are fed as inputs to the NAND gate 26 and said NAND gate produces an output signal of "L" level. Each input to the NAND gate 53 therefore becomes an "L" level and the output becomes an "H" level signal. The oscillator 51 and the step motor 31 thereby start the operation by causing the sliding arm 21x of the rotary switch 21 and the drum 42 to rotate step by step.

When the sliding arm 21x of the rotary switch 21 contacts the fixed contact 21c, said sliding arm becomes at an "H" level potential. The output of the NAND gate 53 thus becomes an "L" level potential again and the oscillator 51 and the step motor 31 stop the operation. At such time, since the rotary drum 42 remains at the position corresponding to the fixed contact 21c, the characters "BRAKE LIGHT", indicating an abnormal condition detected by the brake light sensor 13, are visually observable through the display window 43a.

Furthermore, at such time, both inputs of the NAND gate 26 become an "H" level potential and said NAND gate provides an output signal of "L" level. However, the output signal of the NAND gate 26 is fed as an input to the NAND gate 53 after being delayed by the delay circuit 54 for about 10 seconds. Therefore, after 10 seconds, the NAND gate 53 is supplied the "L" level signal as an input and thereby the output of the sliding arm 21x becomes an "L" level signal. As a result, the oscillator 51 starts oscillation again and the motor 31 rotates the drum 42 and the sliding arm 21x.

When an abnormal condition is detected at the positions of the following fixed contacts 21d to 21h, the motor 31 and drum 42 stop the operation for 10 seconds at the relevant position, displaying an abnormal condition detected by the corresponding sensor. After a while, the sliding arm 21x of the rotary switch 21 contacts the fixed contact 21i. In this case, however, since one or more of the fixed contacts 21a to 21h are at the "H" level, the inverter 25 provides an "L" level signal as its output. The oscillator 51 thus does not cease oscillation at the position of the fixed contact 21i and the motor 31 continues rotating. The drum 42 thus repeatedly carries out a display for the sensor which detects an abnormal condition. During this period, the red lamp 62 lights, warning of the occurrence of an abnormal condition.

Figure 2:
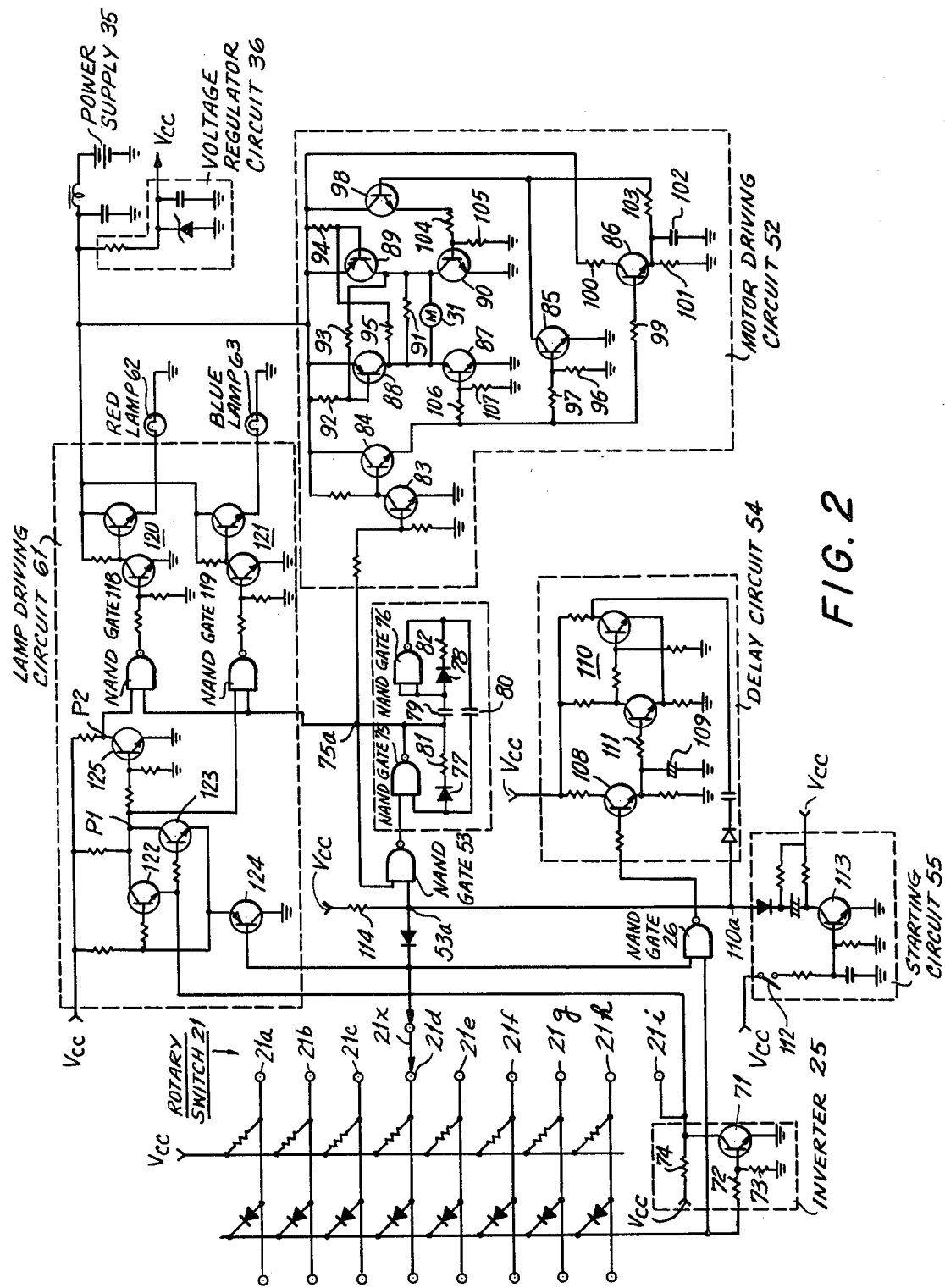
FIG. 2 is a circuit diagram of the embodiment of FIG. 1.

A specific circuit arrangement of the warning display system of FIG. 1 is shown in FIG. 2. The sensors 11 to 18 are not shown in FIG. 2. In FIG. 2, the inverter 25 comprises a transistor 71 and resistors 72, 73 and 74. The inverter 25 controls a constant voltage produced across the resistor 74 by the switching operation of the transistor 71.

The clock pulse generator or oscillator 51 comprises a pair of NAND gates 75 and 76, a pair of diodes 77 and 78, a pair of condensers 79 and 80, and a pair of resistors 81 and 82. The clock pulse signal is provided at the output terminal 75a of the NAND gate 75. The clock pulse signal is returned to an input of the NAND gate 53 and the termination of oscillation is prevented until the end of one cycle of the pulse. This is effective for accurately stopping the sliding arm 21x at the fixed contacts 21a to 21i of the rotary switch 21.

The motor driving circuit 52 comprises a plurality of transistors, resistors and condensers. Transistors 83 and 84 of the motor driving circuit 52 form a pulse input circuit. The pulse signal Pi from the oscillator 51 is amplified and then applied to the base electrodes of transistors 85, 86 and 87. Transistors 87, 88, 89 and 90 of the motor driving circuit 52 are connected as a bridge circuit and the detection terminal of the bridge circuit is connected to the resistor 91 and the motor 31. The transistor 88 of the motor driving circuit 52 is connected to the power supply 35 via the emiiter electrode thereof and is connected to a common point in the connection of resistors 92 and 93 via its base electrode. The other terminal of the resistor 92 is connected to the power supply 35 and the other terminal of the resistor 93 is connected to a point at ground potential via the base-collector path of the transistor 90. The transistor 88 is thus switched to its conductive condition when the transistor 90 is switched to its conductive condition, due to the application of a voltage to the base electrode of the transistor 88.

The transistor 89 of the motor driving circuit 52 is connected to the power supply 35 via the emitter electrode thereof and is connected to a common point in the connection of resistors 94 and 95 via its base electrode. The other terminal of the resistor 94 is connected to the power supply 35 and the other terminal of the resistor 95 is connected to ground via the base-collector path of the transistor 87. The transistor 89 is thus switched to its conductive condition when the transistor 87 is switched to its conductive condition, due to the application of a voltage to the base electrode of the transistor 89.

The base electrode of the transistor 85 is connected to ground via a resistor 96 and is connected to the emitter electrode of the transistor 84 via a resistor 97. The emitter electrode of the transistor 85 is connected to ground and the collector electrode of said transistor is connected to the base electrode of the transistor 98. The base electrode of the transistor 86 is connected to the emitter electrode of the transistor 84 via a resistor 99. The collector electrode of the transistor 86 is connected to the power supply 35 via a resistor 100 and its emitter electrode is connected to ground via a resistor 101 and a condenser 102 and is also connected to the base electrode of the transistor via a resistor 103. The transistor 98 is provided for switching the transistor 90. The collector electrode of the transistor 98 is connected to the power supply 35 and its emitter electrode is connected to the base electrode of the transistor 90 via a resistor 104 and to ground via a resistor 105.

Figure 3A:
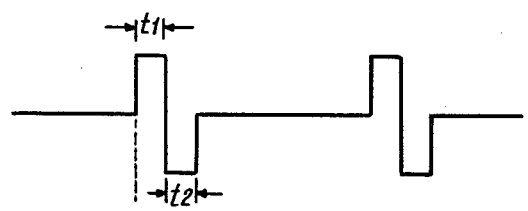
FIGS. 3a to 3d are a time chart for explaining the operation of the motor driving circuit of the warning display system of the invention.
Figure 3B:
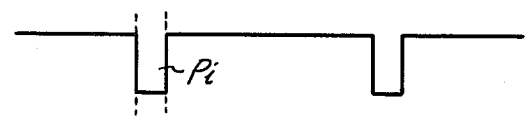

The operation of the circuit is explained by reference to the time chart of FIGS. 3a to 3d. It is supposed that a positive single pulse Pi, shown in FIGS. 3b, is supplied from the oscillator 51. At such time, the transistor 83 is switched to its non-conductive condition, thereby switching the transistor 84 to its conductive condition. A current then flows to the base electrodes of the transistors 87, 85 and 86 via the circuits 35-84-106-87, 35-84-97-85 and 35-84-99-86. The transistor 87 is then switched to its conductive condition, causing is forward current to flow to the step motor 31 via the circuit of 35-89-31-87.

On the other hand, the transistor 86 is switched to its conductive condition when a base current flows, and such current flows via the circuit, 35-100-86-101 or 102-ground, charging the condenser 102. The condenser 102 is rapidly charged, maintaining its potential until the pulse Pi disappears. However, the charging voltage of the condenser 102 is grounded via the resistor 103 and the transistor 85, since said transistor is switched to its conductive condition, and therefore the transistor 98 is not switched to its conductive condition.

When the pulse input Pi disappears after a specific period t1, the transistor 84 is switched to its non-conductive condition and the transistors 87, 85 and 86 are therefore also switched to their non-conductive condition. Thus, the forward current flowing through the step motor 31 is cut. On the other hand, when transistor 85 is switched to its non-conductive condition, the condenser 102 discharges via the resistor 101 and the voltage is applied to the base electrode of the transistor 98 via the resistor 103, whereby the transistor 98 is switched to its conductive condition. When the transistor 98 is in its conductive condition, emitter current flows to the base electrode of the transistor 90 via the resistor 104, thereby switching the transistor 90 to its conductive condition. Therefore, a backward or negative current flows to the motor 31 via the circuit 35-88-31-90.

Figure 3C:
Figure 3D:

The charging voltage of the condenser 102 discharges at the rate of time constant determined by said condenser and the resistors 101 and 103, as shown in FIG. 3c. The discharge of the condenser 102 is completed after a specified period of time t2. The supply of a base voltage to the transistor 98 ceases after the expiration of the period t2, and said transistor is switched to its non-conductive condition. The transistor 90 is thus also switched to its non-conductive conductive condition, and the negative current flowing through the motor 31 is completely cut off. Thus, when a single pulse Pi is supplied as an input, the forward and backward currents, as indicated by the voltage in FIG. 3a, flow through the step motor 31 and thereby said motor rotates one step. The time t2 is the period after completion of the input pulse and it is determined by the time constant of the discharge circuit. There is therefore no fluctuation in such period.

When there is no pulse input Pi, both transistors 87 and 90 are in their non-conductive condition, and therefore no current at all flows through the motor 31. The same operation is successively carried out when the second single pulse Pi is provided as input.

In the motor driving circuit 52, only when an input pulse appears, the driving voltage of one cycle consisting of a positive half wave and negative half wave is applied to the motor. When no input pulse appears, power feeding is not carried out. Power consumption is therefore drastically reduced, and overheating of the motor is prevented.

The delay circuit 54 of FIG. 2 comprises a transistor 108, a condenser 109 and a Schmitt trigger circuit 110. When the transistor 108 is switched to its conductive condition, the condenser 109 is charged. In addition, when the charged voltage is discharged to the level below that specified after about 10 seconds at the rate of the time constant determined by the condenser 109 and the resistor 111, the output terminal 110a of the Schmitt trigger circuit 110 rapidly becomes an "L" level potential. The second input terminal 53a of the NAND gate 53 thereby becomes an "L" level potential.

The starting circuit 55 of FIG. 2 has a switch 112 and a transistor 113. When the switch 112 is closed, the transistor 113 is switched to its conductive condition. The input terminal 53a of the NAND gate 53 is thereby connected to a point at ground potential. When the condition is normal, a constant voltage is applied to the input terminal 53a of the NAND gate 53 via the resistor 114, holding it at the "H" level.

The lamp driving circuit 61 of FIG. 2 has a pair of NAND gates 118 and 119 and amplifier circuits 120 and 121. The NAND gates 118 and 119 of the lamp driving circuit 61 are connected to the output of the oscillator 51. For this reason, the NAND gates 118 and 119 alternately provide output signals of an "H" level and an "L" level in synchronization with the oscillation output 51, causing the lamps 62 and 63 to flash. The lamp driving circuit 61 also includes transistors 122, 123, 124 and 125. The transistor 125 forms an inverter to switch the operation of the NAND gates 118 and 119 for the red and blue lamps 62 and 63.

The circuit of the transistors 122, 123 and 124 of the lamp driving circuit 61 maintains the red lamp 62 OFF when the sliding arm 21x of the rotary switch 21 is at the fixed contact 21i thereof in a normal condition. In other words, at such time, the fixed contact 21i is at the "H" level, so that the transistor 124 is in its non-conductive condition, while a point P1 is at the "H" level and a point P2 is at the "L" level. The NAND gate 118 thereby provides an output signal of "H" level thus switching the red lamp 62 OFF. On the other hand, the NAND gate 119 provides an output signal of "L" level thus switching the blue lamp 63 ON.

When an abnormal condition is detected, the fixed contact 21i of the rotary switch 21 becomes at an "L" level and when the sliding arm 21x of said switch stops at the fixed contact to which the sensor which detects an abnormal condition is connected, the transistor 122 is switched to its conductive condition, since said fixed contact is at the "H" level. In addition, the point P1 becomes at the "L" level, while the point P2 becomes at the "H" level, causing the red lamp 62 to light.

A voltage regulator circuit 36 of FIG. 2 has an output Vcc which is applied to each of the aforementioned circuits.

As is obvious from the foregoing explanation, the warning display system of the invention utilizes very simple structure for positioning the sensors for detecting abnormal conditions and for positioning the display item on the rotary drum. This provides considerable economy in manufacture and operation. Furthermore, as described, the rotary drum is stopped for a display of "OK" under normal conditions. However, when an abnormal condition is detected, the rotary driving device automatically starts rotation of the drum and of the sliding arm of the rotary switch. When the sliding arm of the rotary switch reaches the position of a specific fixed contact representing an abnormal condition, the rotation of the drum stops for a specified period, for a display of an abnormal condition. After the lapse of a specified period of time, the rotation of the drum is started again and the sliding arm of the rotary switch is driven to the next fixed contact representing an abnormal condition, or the aforedescribed fixed contact representing an abnormal condition. As hereinbefore explained, the sliding arm of the rotary switch is repeatedly driven or rotated, so that a perfect display is provided, even when abnormal conditions are detected by several sensors simultaneously. This insures excellent, efficient, effective and reliable operation of the warning display system of the invention. The warning display system of the invention is thus highly practical when used in an automotive vehicle.

While the invention has been described by means of a specific example and in a specific embodiment, we do not wish to be limited thereto, for obvious modifications will occur to those skilled in the art without departing from the spirit and scope of the invention.

We claim:

1. A warning display system for vehicles for warning of an abnormal condition occurring at operating elements of a vehicle having a plurality of operating element, and warning display system comprising
  a plurality of sensors each provided in operative proximity with a corresponding one of the operating elements, each of said sensors detecting an abnormal condition of the corresponding operating element;
  a rotary switch having a plurality of fixed contacts, an additional contact and a sliding arm slidably mounted to selectively electrically contacting each of the fixed contacts, each of the fixed contacts except the additional contact being electrically connected to a corresponding one of the sensors;
  a warning display device having a rotatably mounted drum with a plurality of display items indicated on its circumference, each of the operating elements of the vehicle being represented by a corresponding one of the display items, and a display window adjacent the drum for visual observation of one of the display items at a time;
  a first lamp in the drum for illuminating the lamp and the display item adjacent the display window when the lamp is energized;
  a step motor having an output shaft coupled to the sliding arm of the rotary switch and to the drum for driving said sliding arm and said drum in synchronism;
  an energization circuit for driving the step motor step by step, said energization circuit including an oscillator for generating a pulse and a motor driving circuit electrically connected between the oscillator and said step motor for converting the pulse generated by said oscillator to a driving voltage for energizing said step motor;
  a control circuit electrically connected to the energization circuit for discontinuing the operation of said step motor and energizing said lamp when the sliding arm of the rotary switch reaches the position of the fixed contact of said rotary switch connected to a sensor which detects an abnormal condition, said control circuit warning of the abnormal condition by visually displaying the corresponding display item of the drum at the display window in the illuminated condition of said lamp when said step motor is stopped; and
  position control means having a signal inverting circuit electrically connected between each of the sensors and the additional fixed contact of the rotary switch corresponding to a display item to display a normal condition of all operating elements, said position control means providing an output signal for positioning the sliding arm of the rotary switch on the additional contact until an abnormal condition is detected by a senor.

2. A warning display system for vehicles as claimed in claim 1, further comprising a second lamp having a color different from the first lamp and mounted in the drum opposite the display window for illuminating the display item adjacent the display window when the second lamp is energized, and test means having a manually operable switch electrically connected to the energization circuit for starting the driving of the step motor and energizing the second lamp when said switch is operated.

* * * * *

UNITED STATES PATENT AND TRADEMARK OFFICE
CERTIFICATE OF CORRECTION

PATENT NO. : 4,088,980
DATED : May 9, 1978
INVENTOR(S) : Kou Tanigawa and Takeshi Ochiai It is certified that error appears in the above-identified patent and that said Letters Patent are hereby corrected as shown below:

Foreign Application Priority Data

December 30, 1975    Japan ............ 50-158910

*Signed and Sealed this*

*Twenty-fourth* Day of *October 1978*

[SEAL]

Attest:

RUTH C. MASON
*Attesting Officer*

DONALD W. BANNER
*Commissioner of Patents and Trademarks*